(12) United States Patent
Chhour

(10) Patent No.: US 10,036,450 B2
(45) Date of Patent: Jul. 31, 2018

(54) BACKLASH CORRECTION SYSTEM FOR COMPOUND PLANETARY GEAR TRAIN

(71) Applicant: Goodrich Actuation Systems SAS, Buc (FR)

(72) Inventor: Bertrand Chhour, Paris (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 156 days.

(21) Appl. No.: 15/084,691

(22) Filed: Mar. 30, 2016

(65) Prior Publication Data
US 2016/0290440 A1   Oct. 6, 2016

(30) Foreign Application Priority Data
Mar. 30, 2015 (EP) .................................... 15305460

(51) Int. Cl.
*F16H 1/28* (2006.01)
*B64C 13/28* (2006.01)
*F16H 57/08* (2006.01)
*F16H 1/46* (2006.01)

(52) U.S. Cl.
CPC ........... *F16H 1/2863* (2013.01); *B64C 13/28* (2013.01); *F16H 1/46* (2013.01); *F16H 57/082* (2013.01); *F16H 2001/2872* (2013.01); *F16H 2001/2881* (2013.01)

(58) Field of Classification Search
CPC .................................................. F16H 1/2863
See application file for complete search history.

(56) References Cited

U.S. PATENT DOCUMENTS

| 3,258,995 | A |   | 7/1966  | Bennett   |           |
|-----------|---|---|---------|-----------|-----------|
| 3,434,374 | A | * | 3/1969  | Barwig    | F16H 1/227 |
|           |   |   |         |           | 475/116   |
| 4,843,912 | A |   | 7/1989  | Quick     |           |
| 5,098,359 | A |   | 3/1992  | Chales    |           |
| 2002/0151405 | A1 | * | 10/2002 | Futterer | F16H 1/2863 |
|           |   |   |         |           | 475/331   |
| 2005/0250614 | A1 | * | 11/2005 | Lumpkin | B64C 13/28 |
|           |   |   |         |           | 475/266   |

FOREIGN PATENT DOCUMENTS

| DE | 102011120797 A1 | 6/2013 |
| DE | 102012207250 A1 | 11/2013 |
| DE | 102012210465 A1 | 12/2013 |

OTHER PUBLICATIONS

European Search Report for application No. EP15305460.6; Dated Aug. 28, 2015, 7 pages.

* cited by examiner

*Primary Examiner* — Tisha D Lewis
(74) *Attorney, Agent, or Firm* — Cantor Colburn LLP

(57) ABSTRACT

A compound planetary gear train includes a sun gear, a stationary annulus gear, a first set of planet gears meshing with the stationary annulus gear, a moving annulus gear and a second set of planet gears meshing with the sun gear and the moving annulus gear. The planet gears are biased into contact with the annulus gears.

9 Claims, 2 Drawing Sheets

BACKLASH CORRECTION SYSTEM FOR COMPOUND PLANETARY GEAR TRAIN

FOREIGN PRIORITY

This application claims priority to European Patent Application No. 15305460.6 filed Mar. 30, 2015, the entire contents of which is incorporated herein by reference.

TECHNICAL FIELD

The present disclosure relates to a backlash correction system for a compound gear train.

BACKGROUND

Flight control actuators are used in aircraft to move control surfaces (rudder, elevators and ailerons). Currently, it is mainly linear actuators which are used with elevators and ailerons, because of the very low backlash inherent in linear actuators.

However, if a linear actuator is used, the tailplane or wing carrying the elevator or aileron must be capable of accommodating the linear actuator at full extension, which requires a considerable amount of space inside the tailplane or wing to be set aside for the linear actuator.

Rotary control actuators, although more compact than linear actuators, tend to have greater backlash, which can lead to flutter if the actuators are used to move flight control surfaces.

SUMMARY

There is disclosed herein a compound planetary gear train, including: a sun gear; a stationary annulus gear; a first set of planet gears meshing with the stationary annulus gear; a moving annulus gear; and a second set of planet gears meshing with the sun gear and the moving annulus gear; wherein the planet gears are biased into contact with the annulus gears.

The planet gears may be mounted on shafts carried on an annulus surrounding the sun gear, and the shafts may be biased radially outwardly.

The annulus may be divided into a number of annular sectors, each pair of neighbouring sectors having radial end faces which face each other, and the radial end faces being biased away from each other.

Springs may be disposed between each pair of facing radial end faces. Each annular sector may carry a shaft. The annulus may be divided into four annular sectors.

There is also disclosed herein a flight control actuator incorporating a compound planetary gear train as specified above.

BRIEF DESCRIPTION OF THE DRAWINGS

Some exemplary embodiments of the present disclosure will now be described way of example only and with reference to FIGS. 1 to 6, of which.

DETAILED DESCRIPTION

Figure 1:
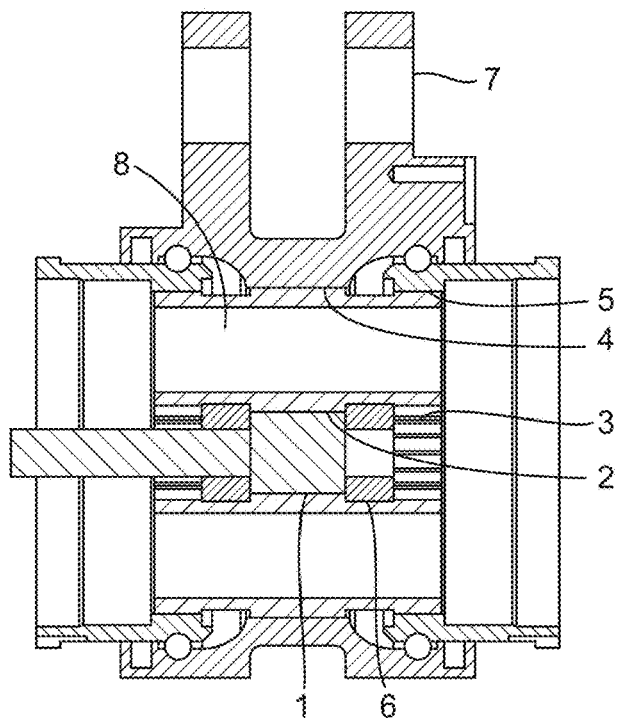
FIG. 1 shows a known compound planetary gear train with a balanced layout with a single compound gear train.
Figure 2:
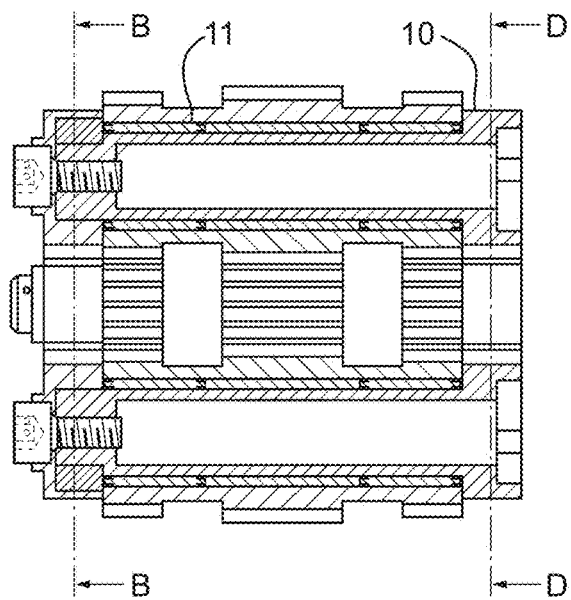
FIG. 2 shows a compound planetary gear train according to one embodiment of the present disclosure.

FIG. 1 shows a known type of compound planetary gear train.

The gear train includes a stationary annulus gear (or ring gear) 5, which may take the form of a fixed gearbox housing with a ring gear formed on its inner surface.

A sun gear 1 is located radially centrally in the gearbox, and is normally coupled to an input (driving) unit.

A moving annulus gear (or ring gear) 4 is provided in an axial gap in the stationary annulus gear 5. The moving annulus gear 4 is normally coupled to an output (driven) unit, and FIG. 1 shows that the moving annulus gear 4 is integral with a bracket 7, which can be connected to a part of a flight control unit.

The sun gear 1 and the annulus gears 4, 5 are coupled by a plurality of planet gears 2, 3, mounted on a common carrier 8. A first set of the gears 3 meshes with the stationary annulus gear 5, and a second set of the gears 2 meshes with the moving annulus gear 4.

The compound planetary gear train shown in FIG. 1 has a balanced layout; this means that three sets of planet gears are arranged along the axial length of the carrier, with the two axially outer gears forming the first set 3 meshing with the stationary annulus gear 5, and the axially inner gear forming the second set 3 and meshing with the moving annulus gear 4. In this case, the axially inner gear forming the second set 2 is also in mesh with the sun gear 1.

Spacers 6 are provided between the planet gears to ensure a correct axial spacing between the sets of gears, and in particular to avoid any chance of a single planet gear meshing with both the stationary annulus gear 5 and the moving annulus gear 4.

It will be appreciated that in practice, the gears will be formed as helical gears.

Backlash (the gap between two meshing gears) is a factor in all reversible gear trains; there must be some backlash present in the gear train, otherwise there will be interference between the gears and jamming of the gear train. However, in many situations, and in particular those where the relative positioning of the input gear and the output gear is key, it is important to reduce the backlash as much as possible.

In a compound planetary gear train such as that described above, there will be backlash. Normally, in this type of gear train, the speed ratio between the sun gear and the moving annulus gear is high. The backlash at the output can be approximated as the sum of the backlash between the moving annulus gear 4 and its corresponding planet gear 2 and the backlash between the stationary annulus gear and its corresponding planet gear 3.

FIGS. 2 to 6 show a part of a compound planetary gear train according to an embodiment of the present disclosure. FIGS. 2 to 6 do not show the moving annulus gear 4 or the fixed annulus gear 5, although it will be appreciated that in practice, these gears will be present. Further, as in the compound planetary gear train shown in FIG. 1, the moving annulus gear 4 can be integrally formed with a bracket, which can be connected to a part of a flight control unit.

The gear train shown in FIGS. 2 to 6 is provided with elements which allow a reduction in backlash between the annulus gears 4, 5 and the planet gears 2, 3 by pushing the planet gears 2, 3 radially outwards against the annulus gears 4, 5. This outward push forces gear contact on both flanks of the tooth, which will tend to reduce backlash, ideally to zero.

In reality, because of manufacturing tolerances, it is not possible to force gear contact on both annulus gears 4, 5. In practice, only one of the engagements between the moving annulus gear 4 and its corresponding planet gear 2 and between the stationary annulus gear 5 and its corresponding planet gear 3 will be forced into contact; the other will merely have its backlash reduced (and ideally minimized).

In the embodiment shown in FIGS. 2 to 6, the planet gears 2, 3 are integrally formed as sleeves supported on shafts 10. Roller bearings 11 are provided between the planet gears 2, 3 and the shafts 10 to allow the gears to rotate freely around the shafts with reduced friction between the gears and the shafts. The diameter of the planet gears 2 which engage with the moving annulus gear 4 is larger than the diameter of the planet gears 3 which engage with the stationary annulus gear 5.

Figure 3:
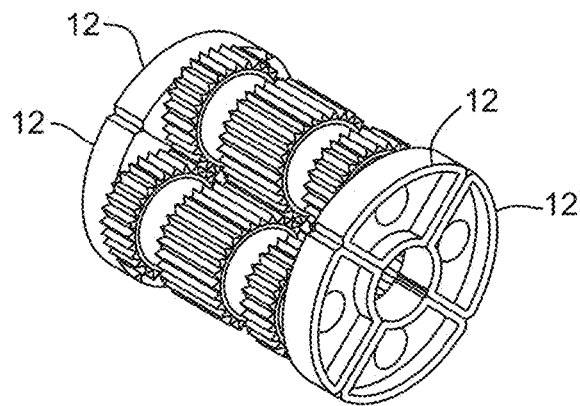
FIG. 3 shows an isometric view of the gear train of FIG. 2.
Figure 4:
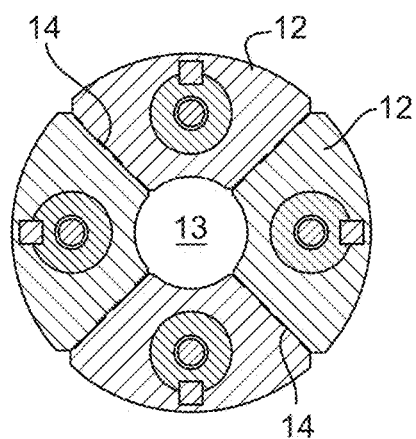
FIG. 4 shows a cross-section taken along line B-B in FIG. 2.
Figure 5:
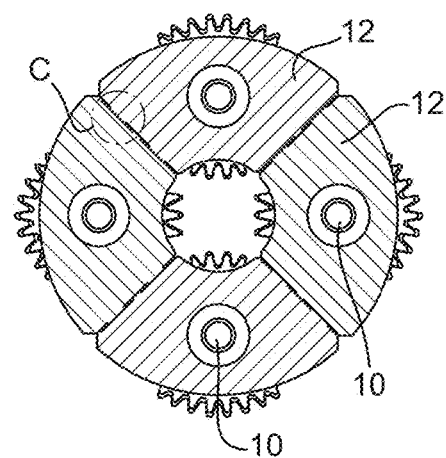
FIG. 5 shows a cross-section taken along D-D in FIG. 2.
Figure 6:
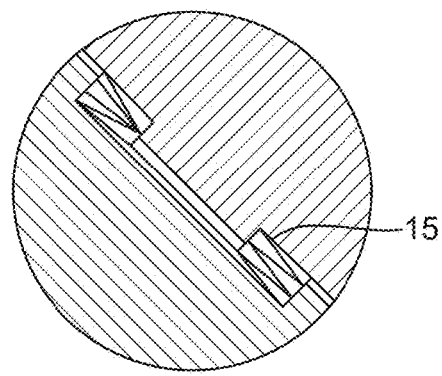
FIG. 6 shows an enlarged view of part C in FIG. 5.

The embodiment shows four shafts 10, as best seen in FIGS. 3, 4 and 5, each of which supports planet gears. The ends of each of the shafts 10 are supported by annular quadrants 12, which together form an annulus. The shaft of the sun 1 gear extends through the opening 13 in the centre of the annulus. The assembly of the shafts 10 and the annular quadrants 12 together forms a planet carrier, which can rotate relative to the sun gear 1, the moving annulus gear 4 and the stationary annulus gear 5.

The radially extending faces 14 of the quadrants 12 support resilient elements such as springs 15, which are interposed between each pair of quadrants. The springs 15 are preferably located in recesses formed on these faces, so that the maximum compression of the springs is limited to a particular amount. Belleville washers may also be used as the resilient element.

When the assembly of the quadrants 12, shafts 10 and planets 2, 3 is assembled in the housing (which supports the fixed annulus gear 5), the springs 15 will tend to expand. Force will be applied to both radially extending faces 14 of each quadrant 12 in a circumferential direction. When considering the topmost quadrant in FIG. 5, the components of the force which act horizontally (with regard to the orientation of the Figure) will cancel each other out; however, there will be a net force urging the quadrant 12 radially outwardly, and (as can be seen from FIG. 5), this will tend to push the engaging teeth of the planet gears 2, 3 radially outwardly. This outward motion of the planet gears 2, 3 reduces the backlash between the planet gears 2, 3 and the annulus gears 4, 5, and thus the overall backlash of the gear train.

In operation of the gear train, as load increases, the springs 15 will be compressed. As mentioned above, the design of the annular quadrants 12 will limit the compression of the springs 15 (as the faces 14 of the quadrants 12 will come into contact with each other after a certain degree of motion), thus preventing the planet gears 2, 3 from being moved too far inwards.

Because of the very low backlash provided, the gear train can be used as part of a rotary flight control actuator, which will be more compact than the linear flight control actuators previously used.

The invention claimed is:

1. A compound planetary gear train, including:
   a sun gear;
   a stationary annulus gear;
   a first set of planet gears meshing with the stationary annulus gear;
   a moving annulus gear; and
   a second set of planet gears meshing with the sun gear and the moving annulus gear;
   wherein the planet gears are biased into contact with the annulus gears;
   wherein the planet gears are mounted on shafts carried on an annulus surrounding the sun gear, and the shafts are biased radially outwardly;
   wherein the annulus is divided into a number of annular sectors, each pair of neighbouring sectors having radial end faces which face each other, and the radial end faces being biased away from each other.

2. A compound planetary gear train as claimed in claim 1, wherein springs are disposed between each pair of facing radial end faces.

3. A compound planetary gear train as claimed in claim 1, wherein each annular sector carries a shaft.

4. A compound planetary gear train as claimed in claim 2, wherein each annular sector carries a shaft.

5. A compound planetary gear train as claimed in claim 1, wherein the annulus is divided into four annular sectors.

6. A compound planetary gear train as claimed in claim 2, wherein the annulus is divided into four annular sectors.

7. A compound planetary gear train as claimed in claim 3, wherein the annulus is divided into four annular sectors.

8. A compound planetary gear train as claimed in claim 4, wherein the annulus is divided into four annular sectors.

9. A flight control actuator incorporating the compound planetary gear train of claim 1.

* * * * *